(12) United States Patent
Iyengar et al.

(10) Patent No.: US 8,591,625 B2
(45) Date of Patent: Nov. 26, 2013

(54) SERVER RACK FRONT DOOR WITH CONTAMINATION FILTER AND SENSOR

(75) Inventors: Madhusudan K. Iyengar, Woodstock, NY (US); Roger R. Schmidt, Poughkeepsie, NY (US); Prabjit Singh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 13/295,078

(22) Filed: Nov. 13, 2011

(65) Prior Publication Data

US 2013/0118353 A1 May 16, 2013

(51) Int. Cl.
*B01D 46/46* (2006.01)

(52) U.S. Cl.
USPC .............. 95/8; 95/19; 95/25; 96/417; 96/421; 55/385.2; 55/385.6; 55/DIG. 34

(58) Field of Classification Search
USPC ......... 55/385.6, DIG. 34; 95/15, 278; 96/413, 96/417, 418, 419, 421, 424; 454/184, 192
See application file for complete search history.

(56) References Cited

U.S. PATENT DOCUMENTS

| | | | | |
|---|---|---|---|---|
| 5,711,785 | A * | 1/1998 | Maxwell | 95/15 |
| 6,164,369 | A | 12/2000 | Stoller | 165/104.33 |
| 6,228,155 | B1 * | 5/2001 | Tai | 96/413 |
| 6,544,309 | B1 * | 4/2003 | Hoefer et al. | 55/283 |
| 6,979,361 | B2 * | 12/2005 | Mihayiov et al. | 96/26 |
| 7,385,810 | B2 | 6/2008 | Chu et al. | 361/679.48 |
| 7,534,167 | B2 | 5/2009 | Day | 454/187 |
| 7,548,170 | B1 | 6/2009 | Griffel et al. | 340/605 |
| 2001/0042616 | A1 | 11/2001 | Baer | 165/299 |
| 2002/0066372 | A1 * | 6/2002 | White | 96/424 |
| 2003/0079449 | A1 * | 5/2003 | Jones | 55/385.6 |
| 2003/0226338 | A1 * | 12/2003 | Yair et al. | 55/385.6 |
| 2004/0163367 | A1 * | 8/2004 | Cogar et al. | 55/385.6 |
| 2005/0061155 | A1 * | 3/2005 | Franey | 96/421 |
| 2006/0064953 | A1 * | 3/2006 | Wong | 55/385.6 |
| 2008/0115473 | A1 * | 5/2008 | Miller | 55/385.6 |
| 2009/0046423 | A1 | 2/2009 | Hom et al. | 361/694 |
| 2009/0225514 | A1 | 9/2009 | Correa et al. | 361/701 |
| 2009/0268404 | A1 | 10/2009 | Chu et al. | 361/696 |
| 2012/0174786 | A1 * | 7/2012 | Sahley | 95/278 |

OTHER PUBLICATIONS

IEEE Conference Paper, "The evolution of water cooling for IBM large server systems: back to the future", Ellsworth, M.J. et al, Jan. 1, 2008.
ASME/Pacific Rim Technical Conference Paper, "Maintaining datacom rack inlet air temperatures with water cooled heat exchanger", Roger Schmidt et al, Dec. 1, 2005.
IPCOM000166855D (Jan. 25, 2008): Display to indicate rate of flow of coolant for a chiller door on a rack.

(Continued)

*Primary Examiner* — Duane Smith
*Assistant Examiner* — Minh-Chau Pham
(74) *Attorney, Agent, or Firm* — Dennis Jung; Ido Tuchman

(57) ABSTRACT

An apparatus, system, and method for preventing server contamination. The system includes a server rack and a contamination filter secured to the server rack. The contamination filter may be configured to filter particulate substances and/or chemical substances from air. The system may include a reaction coupon configured to indicate the presence of particulate substances and/or chemical substances in the air.

21 Claims, 6 Drawing Sheets

(56) References Cited

OTHER PUBLICATIONS

American Society of HRAC Engineers Conference Paper, "Performance of a rack of liquid-cooled servers", Tahir Cader et al, Aug. 30, 2007.

Masters Abstracts of Dissertation, "Comparison of cooling performance of overhead and under floor supply with rear door heat exchanger in high density data center clusters", Ravi Udakeri, vol. 47/01, p. 569, 2008.

IPCOM000183058D (May 13, 2009): Appearance solution for computer server rack enclosure.

* cited by examiner

SERVER RACK FRONT DOOR WITH CONTAMINATION FILTER AND SENSOR

BACKGROUND

This invention involves the filtration of particulate and chemical substances.

Modern electronic devices include large numbers of tiny metal components. For example, metal lines are used to connect components on an integrated circuit such as a printed circuit board. Some airborne substances cause the growth of filaments on the metals in electronic devices. These filaments may hamper or destroy device functionality. For example, the metal lines on a printed circuit board device may become shorted with the growth of filaments caused by exposure to sulfur found in common airborne pollutants.

BRIEF SUMMARY

An example embodiment of the present invention is an apparatus for preventing server contamination. The apparatus may include a contamination filter configured to secure to a server rack and filter at least one of particulate substances and chemical substances from air.

Another example embodiment of the present invention is a system for preventing server contamination. The system may include a server rack and a contamination filter secured to the server rack. The contamination filter may be configured to filter at least one of particulate substances and chemical substances from air.

Yet another example embodiment of the invention is a method for preventing server contamination. The method may include securing a contamination filter to a server rack. The contamination filter may be configured to filter at least one of particulate substances and chemical substances from air.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-6. As discussed in detail below, embodiments of the present invention include an apparatus, system, and method for preventing server contamination by securing a contamination filter to a server rack.

Figure 1:
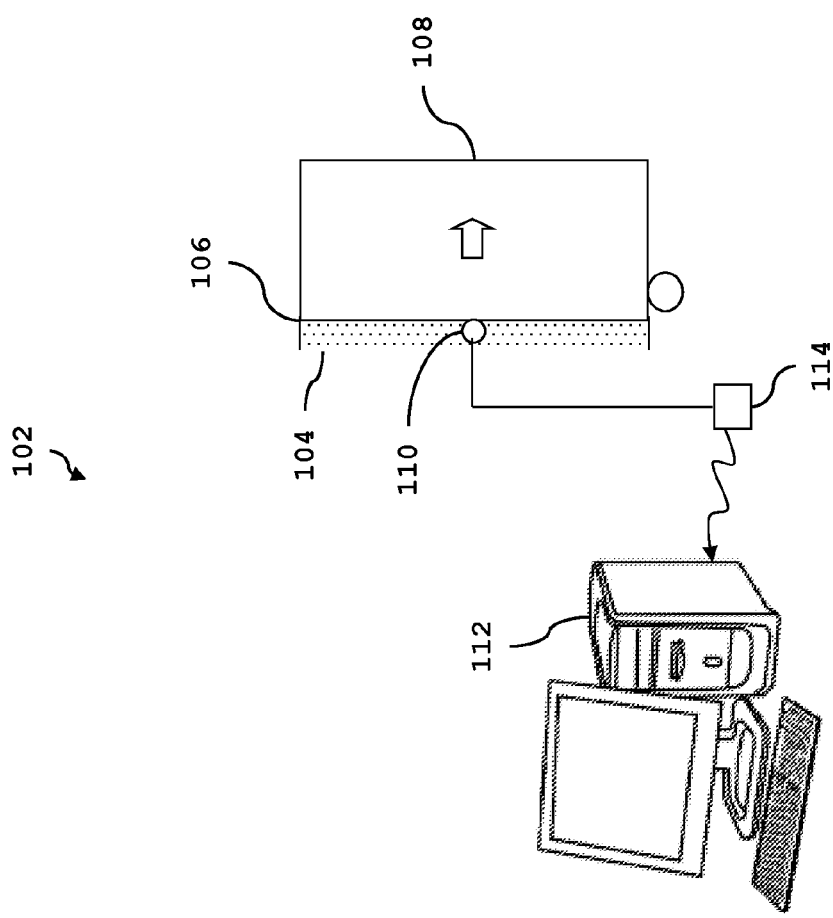
FIG. 1 shows an example embodiment of a system for preventing server contamination.

FIG. 1 shows an example embodiment of an apparatus and system 102 for preventing server contamination. System 102 may include a contamination filter 104 configured to secure at an air inlet 106 of a server rack 108. In one embodiment, the system 102 may include a server rack 108 and a contamination filter 104 secured to the server rack 108. The contamination filter 104 may be secured in the front door of the server rack 108. The contamination filter 104 may be configured to filter particulate substances and/or chemical substances from air. Examples of particulate and chemical substances may include volcanic ash, chemical plant emissions, power plant emissions, pollution, airborne chemicals released from chemical spills, smoke from building or forest fires, sheetrock dust, and a wide variety of other substances recognized by those of ordinary skill in the art as potentially harmful to electronic equipment.

In one embodiment, the contamination filter 104 is positioned at an air inlet 106 of the server rack 108. The air inlet 106 may be a location where air enters the server rack 108 before traveling through the server rack. System 102 may include a reaction coupon 110 configured to indicate the presence of particulate substances and/or chemical substances in the air. In one embodiment, the reactive coupon 110 is physically integrated with the contamination filter 104. The reactive coupon 110 may be positioned so that it is exposed to the air. The reactive coupon 110 may change its properties from exposure to particulate substances and/or chemical substances in the air. One example change in properties of the reactive coupon 110 is a change in color to indicate the presence of sulfuric substances in the air. Another example change in properties of the reactive coupon 110 is a change in resistivity correlating to the amount of exposure to certain substances in the air.

In one embodiment, system 102 includes a central database 112 and a sensor 114. Though shown as separate from the server rack in FIG. 1, the sensor 114 may be located on or inside the server rack 108. The sensor 114 may also be integrated with the contamination filter 104. The sensor 114 may be configured to measure a change in the reaction coupon 110. In one embodiment, the sensor 114 is configured to report to the central database 112 a change in the reaction coupon 110. In one embodiment, the sensor 114 is configured to indicate the current level of particulate substances and/or chemical substances in the air. The sensor 114 may be configured to report to the central database 112 the amount of particulate substances and/or chemical substances in the air. The sensor 114 may be configured to indicate information about the contamination filter 104. In one embodiment, the sensor 114 is configured to report to the central database 112 information about the contamination filter 104. The sensor 114 may be configured to measure a pressure change across the contamination filter 104. In one embodiment, the sensor 114 includes an alarm as an indicator. An alarm may include audible noise, flashing or blinking lights, and other alarm devices.

The sensor 114 may be implemented as a single sensor configured to perform one or more functions described above or as a variety of sensors individually configured to perform the functions described above. In one embodiment, the central database 112 is configured to store information reported by sensor 114. The central database 112 may be configured to allow a user to view changes in the information collected by the sensor 114 over different periods of time. In one embodiment, the central database 112 may allow a user to monitor reported information in real time, i.e., as the information is received from sensor 114. The sensor 114 may be connected to the central database 112 through a network. Those of ordinary skill in the art will recognize a variety of wired and wireless network implementations for connecting the sensor 114 and the central database 112. A central database 112 may not be included in embodiments of system 102 requiring only an indicator.

Figure 2:
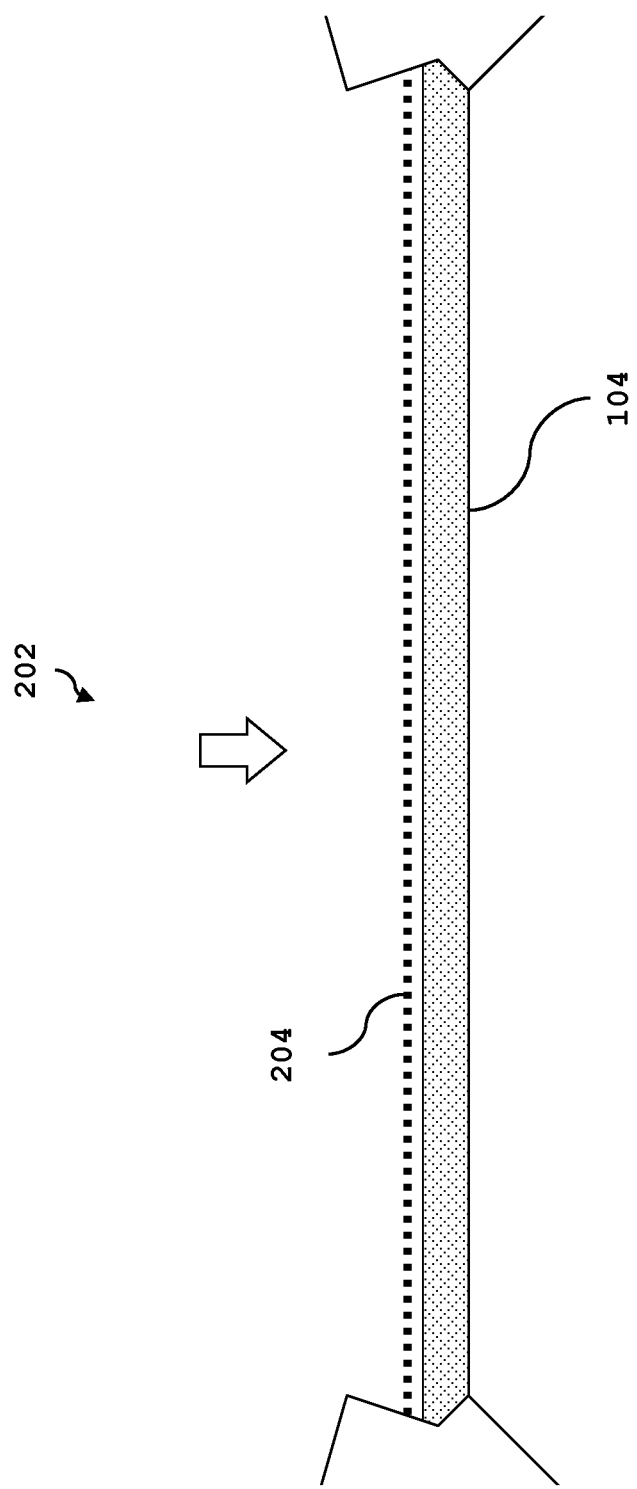
FIG. 2 shows a cross-section from a top down view of an example embodiment of a front server door.

FIG. 2 shows a cross-section from a top down view of an example embodiment of a front server door 202. The front server door may be part of the apparatus and system 102 described above. The front server door 202 may be positioned at an air inlet 106 of the server rack 108. The front server door 202 may include a perforated sheet 204. The perforated sheet 204 may be metal or other suitable material. In one embodiment, the perforated sheet 204 includes holes that are between forty to eighty percent open. Each hole may be in the shape of a hexagon, but a variety of other hole patterns may be used. In one embodiment, the perforated sheet 204 may be proximate the contamination filter 104. The perforated sheet 204 may be between the air flow and contamination filter 104. The arrow in FIG. 2 shows the direction of the air flow into the air inlet 106 of the server rack 108.

Figure 3:
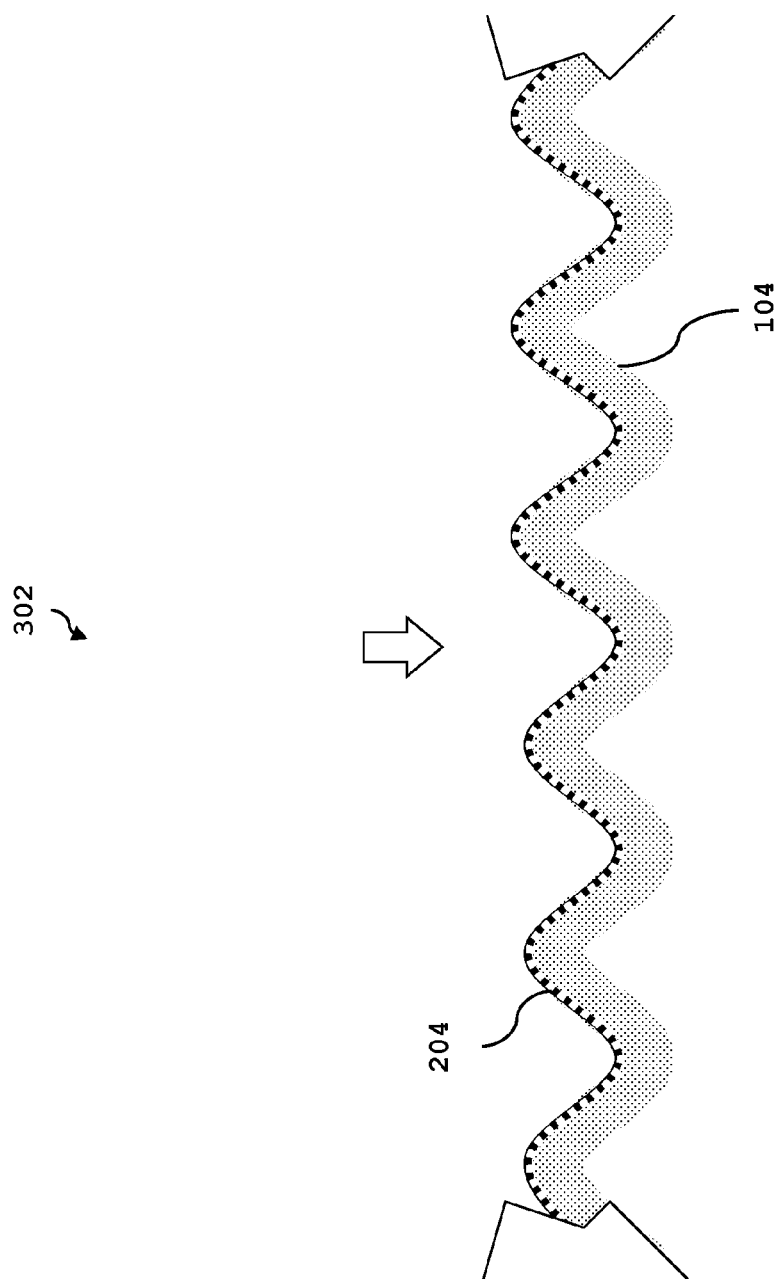
FIG. 3 shows a cross-section from a top down view of another example embodiment of a front server door.

FIG. 3 shows a cross-section from a top down view of another example embodiment of a front server door 302. The front server door 302 may include the features of front server door 202. In one embodiment, the front server door 302 includes a perforated sheet 204 proximate the contamination filter 104. The perforated sheet 204 and contamination filter 104 may be in the shape of a wave. Though the perforated sheet 204 and contamination filter 104 are shown in the shape of a sinusoidal wave, other waveforms may be suitable.

Figure 4:
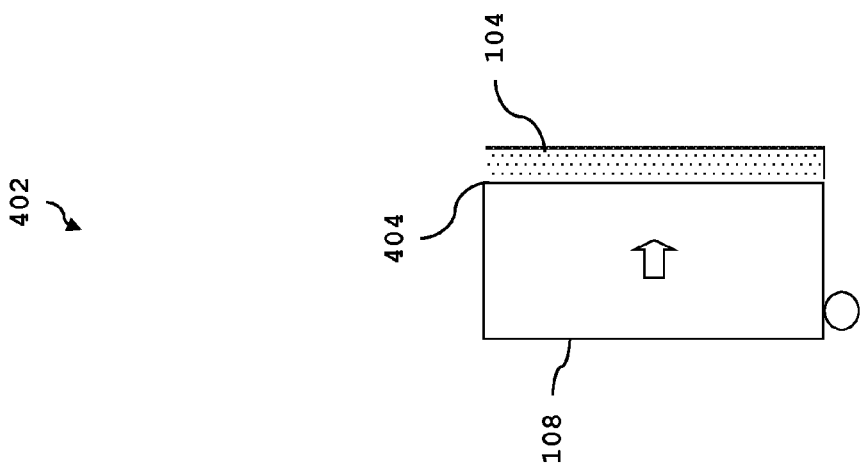
FIG. 4 shows an example embodiment of a system in which a contamination filter is secured at an air outlet of a server rack.

FIG. 4 shows an example embodiment of a system 402 for preventing server contamination. It should be noted that embodiments of system 402 may include many or all of the elements described above in system 102 though these elements are not explicitly shown in FIG. 4. The contamination filter 104 may be configured to secure at an air outlet 404 of a server rack 108. The air outlet 404 may be a location where air exits the server rack 108 after traveling through the server rack 108.

Figure 5:
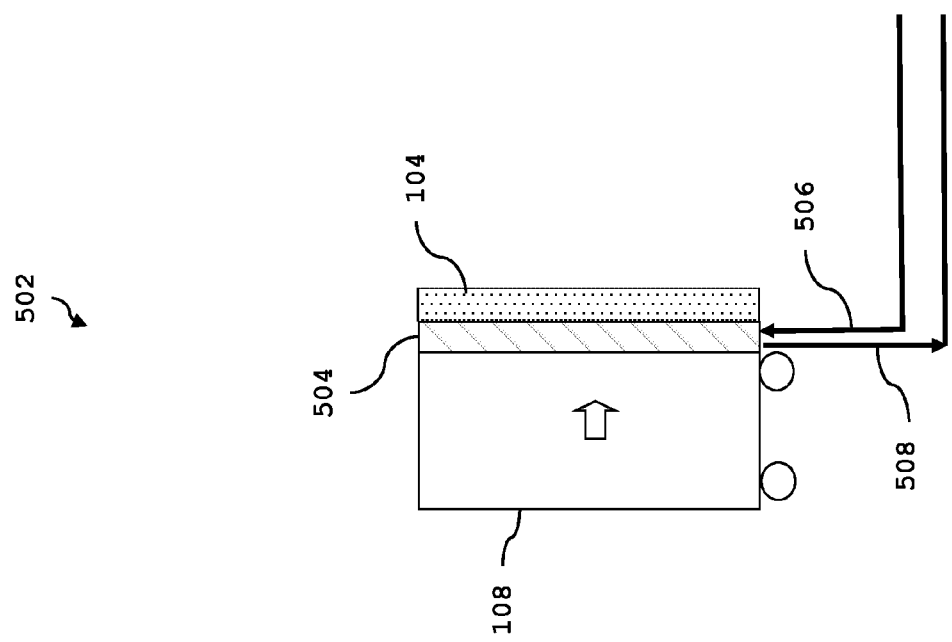
FIG. 5 shows an example embodiment of a system in which a server rack includes a rear door heat exchanger coupled to the contamination filter.

FIG. 5 shows an example embodiment of a system 502 for preventing server contamination. It should be noted that embodiments of system 502 may include many or all the elements described above in system 402 though these elements are not explicitly shown in FIG. 5. In system 502, the server rack 108 may include a rear door heat exchanger 504 coupled to the contamination filter 104. The rear door heat exchanger 504 may be positioned between the server rack 108 and the contamination filter 104. The rear door heat exchanger 504 may include a liquid intake 506 and a liquid outtake 508. The liquid intake 506 may carry cooled liquid into the server rack and the liquid outtake 508 may carry away this liquid after being heated by devices in the server rack.

Figure 6:
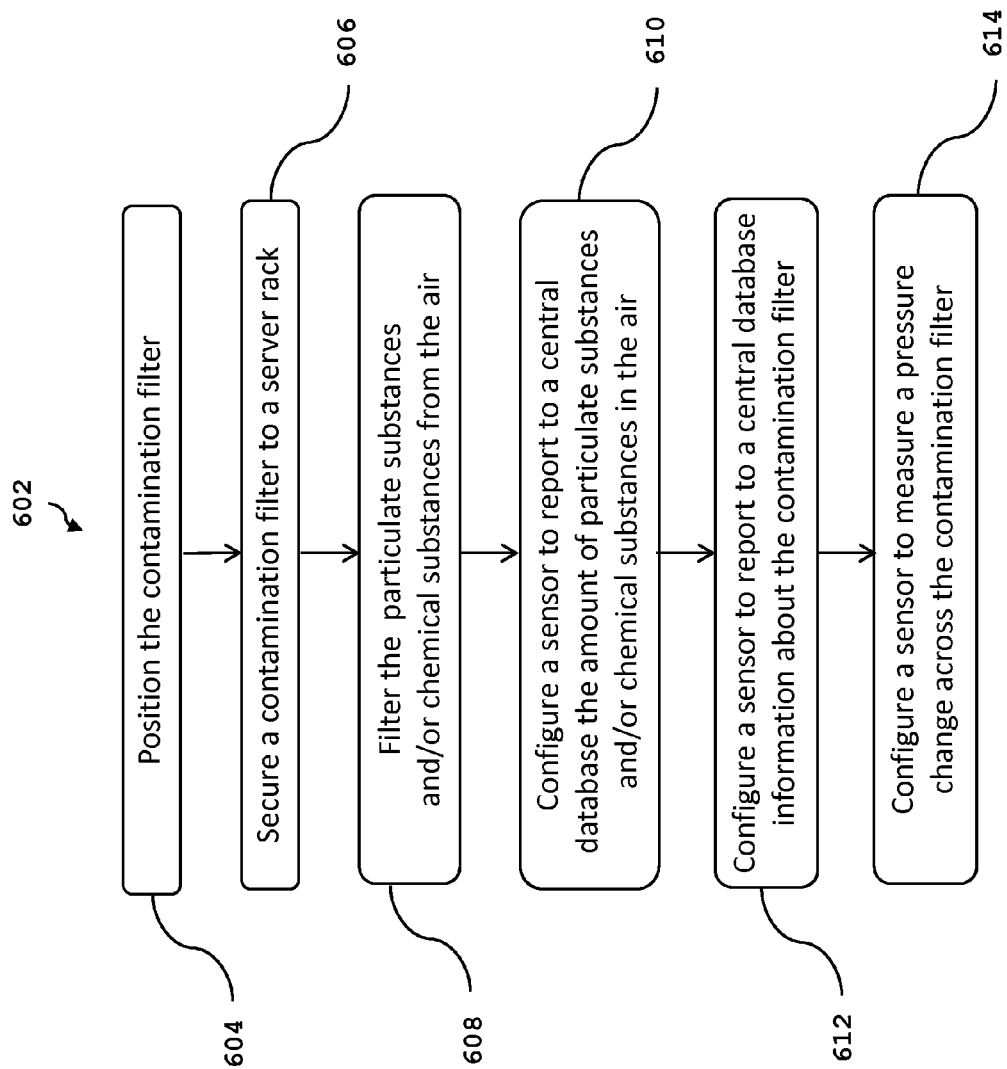
FIG. 6 shows an example embodiment of a method for preventing server contamination.

FIG. 6 shows an example embodiment of a method 602 for preventing server contamination. Method 602 may include a positioning step 604 of positioning the contamination filter. In one embodiment, the contamination filter is positioned at an air inlet of the server rack. The air inlet may be a location where air enters the server rack before traveling through the server rack. For example, the contamination filter may be secured in the front door of the server rack. In one embodiment, the positioning step 604 includes positioning a perforated sheet proximate the contamination filter. The perforated sheet and contamination filter may be in the shape of a wave. The perforated sheet and contamination filter are further described above.

In another embodiment, the contamination filter is positioned at an air outlet of the server rack. The air outlet may be a location where air exits the server rack after traveling through the server rack. Method 602 may include a securing step 606 of securing a contamination filter to a server rack. In one embodiment, the server rack includes a rear door heat exchanger coupled to the contamination filter. The securing step 606 may include coupling the contamination filter to the rear door heat exchanger. The contamination filter may be configured to filter particulate substances and/or chemical substances from air.

In one embodiment, method 602 includes a filtering step 608 of filtering particulate substances and/or chemical substances from the air. Examples of particulate and chemical substances are described above. Method 602 may include an air sensor configuration step 610 of configuring a sensor to report to a central database the amount of particulate substances and/or chemical substances in the air. In one embodiment, method 602 includes a contamination filter sensor configuration step 612 of configuring a sensor to report to a central database information about the contamination filter. Method 602 may include a pressure sensor configuration step 614 of configuring a sensor to measure a pressure change across the contamination filter. As described above, the sensor configured in the previous steps may be implemented as one sensor or multiple different sensors.

While the preferred embodiments to the invention have been described, it will be understood that those skilled in the art, both now and in the future, may make various improvements and enhancements that fall within the scope of the claims which follow. These claims should be construed to maintain the proper protection for the invention first described.

What is claimed is:

1. An apparatus for preventing server contamination, comprising:
   a contamination filter configured to secure to a server rack and filter at least one of particulate substances and chemical substances from air;
   a reaction coupon configured to indicate a presence of at least one of particulate substances and chemical substances in the air; and
   a sensor configured to measure a change in the reaction coupon.

2. The apparatus of claim 1, wherein the contamination filter is configured to secure at an air inlet of a server rack.

3. The apparatus of claim 1, wherein the contamination filter is configured to secure at an air outlet of a server rack.

4. The apparatus of claim 1, wherein the contamination filter is coupled to a rear door heat exchanger.

5. The apparatus of claim 1, further comprising:
   wherein the sensor is configured to indicate a current level of at least one of particulate substances and chemical substances in the air.

6. The apparatus of claim 1, further comprising:
   a perforated sheet proximate the contamination filter, the perforated sheet and contamination filter being in the shape of a wave.

7. A system for preventing server contamination, comprising:
   a server rack; and
   a contamination filter secured to the server rack, the contamination filter configured to filter at least one of particulate substances and chemical substances from air;
   a central database; and
   a sensor configured to report to the central database information about the contamination filter.

8. The system of claim 7, wherein the contamination filter is positioned at an air inlet of the server rack.

9. The system of claim 7, wherein the contamination filter is positioned at an air outlet of the server rack.

10. The system of claim 7, wherein the server rack includes a rear door heat exchanger coupled to the contamination filter.

11. The system of claim 7, further comprising:
a reaction coupon configured to indicate a presence of at least one of particulate substances and chemical substances in the air.

12. The system of claim 11,
wherein the sensor is configured to report to the central database a change in the reaction coupon.

13. The system of claim 7, further
wherein the sensor is configured to report to the central database an amount of at least one of particulate substances and chemical substances in the air.

14. The system of claim 7,
wherein the sensor is configured to measure a pressure change across the contamination filter.

15. A method for preventing server contamination, the method comprising:
securing a contamination filter to a server rack, the contamination filter configured to filter at least one of particulate substances and chemical substances from air; and
configuring a sensor to report to a central database information about the contamination filter.

16. The method of claim 15, further comprising:
positioning the contamination filter at an air inlet of the server rack.

17. The method of claim 15, further comprising:
positioning the contamination filter at an air outlet of the server rack.

18. The method of claim 15, further comprising:
filtering the at least one of particulate substances and chemical substances from the air.

19. The method of claim 15, wherein the server rack includes a rear door heat exchanger coupled to the contamination filter.

20. The method of claim 15, further comprising:
configuring the sensor to report to the central database an amount of at least one of particulate substances and chemical substances in the air.

21. The method of claim 15, further comprising:
configuring the sensor to measure a pressure change across the contamination filter.

* * * * *